United States Patent
Wang et al.

(10) Patent No.: US 12,486,998 B1
(45) Date of Patent: Dec. 2, 2025

(54) METHOD AND SYSTEM FOR CONTROLLING HEATING, VENTILATION, AND AIR CONDITIONING SYSTEM IN BUILDINGS BASED ON ADAPTIVE MODEL PREDICTIVE CONTROL

(71) Applicant: SHANDONG UNIVERSITY, Jinan (CN)

(72) Inventors: Xinli Wang, Jinan (CN); Jiayi Xiao, Jinan (CN); Xiaohong Yin, Jinan (CN); Chen Lin, Jinan (CN); Lei Jia, Jinan (CN); Fang Geng, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/263,418

(22) Filed: Jul. 8, 2025

(30) Foreign Application Priority Data

Dec. 13, 2024 (CN) .......................... 202411833783.1

(51) Int. Cl.
  *F24F 11/63* (2018.01)
  *F24F 11/77* (2018.01)
  *F24F 11/80* (2018.01)

(52) U.S. Cl.
  CPC .............. *F24F 11/63* (2018.01); *F24F 11/77* (2018.01); *F24F 11/80* (2018.01)

(58) Field of Classification Search
  CPC ...... G06Q 10/04; G06F 30/27; G05B 13/042; G05B 13/048; G06N 20/00; F24F 11/63; F24F 11/77; F24F 11/80
  See application file for complete search history.

(56) References Cited

U.S. PATENT DOCUMENTS

| | | |
|---|---|---|
| 9,235,657 B1 | 1/2016 | Wenzel et al. |
| 12,379,129 B2 * | 8/2025 | Kobayashi ............... F24F 11/77 |

(Continued)

FOREIGN PATENT DOCUMENTS

| | | |
|---|---|---|
| CN | 116336546 A | 6/2023 |
| WO | 2024068785 A1 | 4/2024 |

OTHER PUBLICATIONS

Wang, W., Yorino, N., Sasaki, Y., Zoka, Y., Bedawy, A. and Kawauchi, S., 2022. A novel adaptive model predictive frequency control using unscented Kalman filter. Electric Power Systems Research, 213, p. 108721. (Year: 2022).*

(Continued)

*Primary Examiner* — Alicia M. Choi
(74) *Attorney, Agent, or Firm* — IPro, PLLC; Na Xu (57) ABSTRACT

A method and system for controlling a heating, ventilation, and air conditioning system (HVAC) in a building based on adaptive model predictive control (MPC) is disclosed, and belongs to the technical field of intelligent building adaptive control. The method may include: acquiring operation data of the HVAC under different working conditions, and performing preprocessing on the acquired data; calculating a marginal fitness measure (MAD) of each data point for each class based on the preprocessed data, and calculating a fitness measure of each data point for each class by combining MADs of all descriptors to obtain a global fitness measure (GAD); setting a GAD threshold, and classifying current operation states of the system according to classification rules; and adopting adaptive control strategies for different operation states since model parameters of each class are fixed after classification.

8 Claims, 1 Drawing Sheet

(56) References Cited

U.S. PATENT DOCUMENTS

| | | | |
|---|---|---|---|
| 2009/0240480 A1 | 9/2009 | Baramov | |
| 2018/0031262 A1* | 2/2018 | Atchison | ................ F24F 11/65 |
| 2019/0025774 A1* | 1/2019 | Wenzel | ............... G05B 13/048 |
| 2019/0271483 A1* | 9/2019 | Joo | ........................ F24F 11/62 |
| 2020/0208861 A1* | 7/2020 | Chen | ..................... G06N 3/045 |
| 2020/0218991 A1* | 7/2020 | Alanqar | ................ G05B 15/02 |
| 2022/0316736 A1* | 10/2022 | Nabi | ...................... G06F 17/13 |
| 2023/0038215 A1* | 2/2023 | Menner | ............. G05B 23/0254 |
| 2024/0004088 A1* | 1/2024 | Greiff | .................... G01S 19/51 |

OTHER PUBLICATIONS

Shi, Z. and O'Brien, W., 2019. Sequential state prediction and parameter estimation with constrained dual extended Kalman filter for building zone thermal responses. Energy and Buildings, 183, pp. 538-546. (Year: 2019).*

L. Morales1, J. Aguilar2,5, member IEEE, A. Garces-Jimenez3, J. Gutierrez de Mesa4, J.Gomez-Pulido4, "Advanced fuzzy-logic-based context-driven control for HVAC management systems in buildings", IEEE Access, vol. 2020, No. 8, Jan. 1, 2020.

Ren Kai, "Analysis of energy-saving renovation and indoor temperature prediction of university libraries", Full-text Database of Excellent Master's Theses in China: Engineering and Technology II, Jun. 15, 2024.

* cited by examiner

METHOD AND SYSTEM FOR CONTROLLING HEATING, VENTILATION, AND AIR CONDITIONING SYSTEM IN BUILDINGS BASED ON ADAPTIVE MODEL PREDICTIVE CONTROL

CROSS-REFERENCE TO RELATED APPLICATIONS

The present disclosure claims priority to Chinese Patent Application No. 202411833783.1 filed with China National Intellectual Property Administration on Dec. 13, 2024, and entitled "METHOD AND SYSTEM FOR CONTROLLING HEATING, VENTILATION, AND AIR CONDITIONING SYSTEM IN BUILDINGS BASED ON ADAPTIVE MODEL PREDICTIVE CONTROL", which is incorporated herein by reference in its entirety.

TECHNICAL FIELD

The present disclosure belongs to the technical field of intelligent building adaptive control, and in particular to a method and system for controlling a heating, ventilation, and air conditioning system (HVAC) in a building based on adaptive model predictive control (MPC).

BACKGROUND

The description in this part only provides background technical information related to the present disclosure and does not necessarily constitute the prior art.

With the increasing global energy consumption and worsening environmental problems, building energy efficiency has become one of the important challenges facing today's society. In modern building management, the energy consumption of HVACs accounts for a significant portion of the total building energy consumption. With the increase of energy cost and the improvement of environmental awareness, improving the energy efficiency of the HVACs has become a key issue.

Since conventional HVAC control methods are usually based on fixed control strategies such as MPC, these strategies are difficult to adapt to the complex operating conditions of the HVACs. In addition, with the continuous changes in system parameters and surrounding environments, it will lead to low system running efficiency and serious energy waste. Moreover, in nonlinear systems, conventional MPC is susceptible to noise and measurement errors during state estimation, resulting in poor control performance. When faced with rapidly changing operating conditions, the optimization of control strategies may lag, making it difficult to make optimal decisions in complex and changing environments. In addition, when dealing with uncertainty and external disturbances, the system robustness and reliability are low, and energy consumption may be high due to lack of accuracy.

SUMMARY

In order to overcome the defects of the existing technologies mentioned above, the present disclosure provides a method for controlling an HVAC in a building based on adaptive MPC, which ensures efficient running of the HVAC under different operating conditions, and not only improves the energy efficiency and running stability of the system, but also ensures the comfort of an indoor environment.

In order to realize the above objective, one or more embodiments of the present disclosure provide the following technical solution.

According to a first aspect, the present disclosure discloses a method for controlling an HVAC in a building based on adaptive MPC, comprising:
  acquiring operation data of the HVAC under different working conditions, and performing preprocessing on the acquired data;
  calculating a marginal fitness measure (MAD) of each data point for each class based on the preprocessed data, and calculating a fitness measure of each data point for each class by combining marginal fitness measures (MADs) of all descriptors to obtain a global fitness measure (GAD);
  setting a GAD threshold, and classifying current operation states of the system according to classification rules; and
  adopting adaptive control strategies for different operation states since model parameters of each class are fixed after classification,
  wherein, in each control cycle, a state estimate updated by Kalman filtering is used as a current state input of an adaptive model based on the classification result, and an optimal control input sequence for a future period is solved based on a current state and a prediction model to adjust operation parameters of the HVAC.

As a further technical solution, the model parameters of each class comprise a state transition matrix, a control input matrix, a control output matrix, a process noise covariance matrix, and a measurement noise covariance matrix.

As a further technical solution, the method further comprises: updating a center of each class, defined as a mean in a membership function, by weighted averaging based on memberships of data points.

As a further technical solution, a state estimation process for the HVAC comprises:
  constructing a state space model for the HVAC;
  linearizing a state transition equation in the state space model;
  linearizing an output equation in the state space model;
  performing real-time linearization and adjustment on preset parameters of the linearized state space model according to the current state and a control input during running; and
  performing prediction and updating steps of Kalman filtering using adjusted parameters, providing an accurate state estimate, and dynamically updating the model parameters to enable the prediction model to accurately reflect the current dynamic behavior of the system.

As a further technical solution, linearizing a state transition equation in the state space model specifically comprises:
  performing first-order Taylor expansion on a nonlinear state transition equation in the state space model at a current state estimate and a control input;
  calculating a Jacobian matrix using the current state and the control input, modifying preset classification parameters, and seeking a partial derivative of a state transition function with respect to the control input to obtain the Jacobian matrix; and
  finally obtaining a linearized state transition function.

As a further technical solution, linearizing an output equation in the state space model specifically comprises:
  performing first-order Taylor expansion on a nonlinear output equation at the current state estimate to obtain a linearized output equation.

As a further technical solution, when inputting the Kalman-filtered state estimate into MPC, a state estimate $\hat{x}(k)$ provided by a Kalman filter is used as a current initial state to obtain a cost function of MPC;
constraints for problem optimization comprise a state constraint and a control input constraint; and
room temperature is enabled to be close to target temperature as much as possible to ensure comfort by minimizing the cost function, and the optimal control input sequence is solved by controlling cooling power and fan speed to satisfy the constraints.

According to a second aspect, the present disclosure discloses a system for controlling an HVAC in a building based on adaptive MPC, comprising:
an operation data acquisition module configured to acquire operation data of the HVAC under different working conditions, and perform preprocessing on the acquired data;
a GAD calculation module configured to calculate a MAD of each data point for each class based on the preprocessed data, and calculate a fitness measure of each data point for each class by combining MADs of all descriptors to obtain a GAD;
a classification module configured to set a GAD threshold, and classify current operation states of the system according to classification rules; and
a control module configured to adopt adaptive control strategies for different operation states since model parameters of each class are fixed after classification,
wherein, in each control cycle, a state estimate updated by Kalman filtering is used as a current state input of an adaptive model based on the classification result, and an optimal control input sequence for a future period is solved based on a current state and a prediction model to adjust operation parameters of the HVAC.

The above one or more technical solutions have the following beneficial effects:

The technical solutions provided in the present disclosure can adapt to environmental changes: by combining state recognition of an LAMDA algorithm, state estimation of Kalman filtering, and optimization control of MPC, the system can provide real-time decision support in complex and changing environments; through real-time data collection and analysis, the present disclosure can dynamically adjust the operation parameters of the HVAC, thereby making the system minimize the energy consumption while meeting comfort requirements. This helps to significantly reduce the overall energy consumption of the building and improve the energy utilization efficiency.

The technical solutions provided in the present disclosure can solve the interference of the nonlinear systems: by combining an LAMDA method, Kalman filtering, and MPC, the technical solutions in the embodiments can optimize the control strategies in real time. The LAMDA method can provide accurate state recognition and classification information, making the prediction model more accurate and thereby improving the control accuracy. By combining the system model with real-time measurement data, the Kalman filtering algorithm can provide the best estimate of the system state, filter out measurement noise in the nonlinear systems, and improves the accuracy of state estimation.

The advantages of the additional aspects of the present disclosure will be set forth in part in the description below, which will become apparent from the description below, or will be understood by the practice of the present disclosure.

BRIEF DESCRIPTION OF THE DRAWINGS

The drawings of the description, which form a part of the present disclosure, are intended to provide a further understanding of the present disclosure. The exemplary embodiments of the present disclosure and their descriptions are intended to describe the present disclosure, instead of constituting any improper limitation on the present disclosure.

DETAILED DESCRIPTION

The following detailed descriptions are exemplary and intended to provide further description of the present disclosure. Unless otherwise specified, all technical and scientific terms used herein have the same meanings as those commonly understood by ordinary technical personnel in the technical field to which the present disclosure belongs.

The terms used here are only for describing specific embodiments and are not intended to limit exemplary embodiments according to the present disclosure.

Without causing any conflict, the embodiments of the present disclosure and the features in the embodiments may be combined with each other.

In order to overcome the limitations of the conventional control methods and enhance the adaptability and intelligence level of the system, the technical solution in the present example provides a control method for an HVAC based on adaptive MPC that combines a Learning Algorithm for Multivariable Data Analysis (LAMDA) method and an extended Kalman filtering method.

The technical solution in the present example introduces the LAMDA method and the extended Kalman filter method. First, real-time classification is performed based on the LAMDA algorithm. By combining with a classification result of the LAMDA algorithm, the system can effectively reduce unnecessary energy consumption and improve energy utilization efficiency. Second, Kalman filtering provides the best estimate of the system state by combining the system model and real-time measurement data, thereby effectively filtering out measurement noise and process noise, and improving the accuracy of state estimation. By combining the state estimation of Kalman filtering with the real-time classification of LAMDA, the system can provide real-time decision support in complex and changing environments. MPC can dynamically optimize control based on the latest system state and operating environment to ensure that the control strategies are always in the best state. In addition, Kalman filtering can enhance the system's ability to handle noise and uncertainty, while the real-time state recognition of the LAMDA algorithm improves the system's adaptability to environmental changes and can effectively handle nonlinear complex systems, thereby greatly improving the robustness and reliability of the system.

The technical solution in the present example further provides a control system for the HVAC based on the adaptive MPC that combines the LAMDA method and the extended Kalman filtering method.

By introducing the LAMDA method, the system can recognize and classify the operation states in real time, dynamically adjust the control strategies, and continuously update the model parameters and optimize the control rules through the extended Kalman filtering method, thereby achieving efficient energy management and stable system operation.

Specific solutions comprise data preprocessing and classification, state estimation, model adjustment, dynamic optimization of control strategies, thereby ensuring efficient running of the HVAC under different operating conditions, and not only improving the energy efficiency and running stability of the system, but also ensuring the comfort of an indoor environment.

Explanation of Terms

LAMDA: Learning Algorithm for Multivariable Data Analysis;
MPC: adaptive model predictive control;
HVAC: Heating, Ventilation, and Air Conditioning System Example 1

Figure 1:
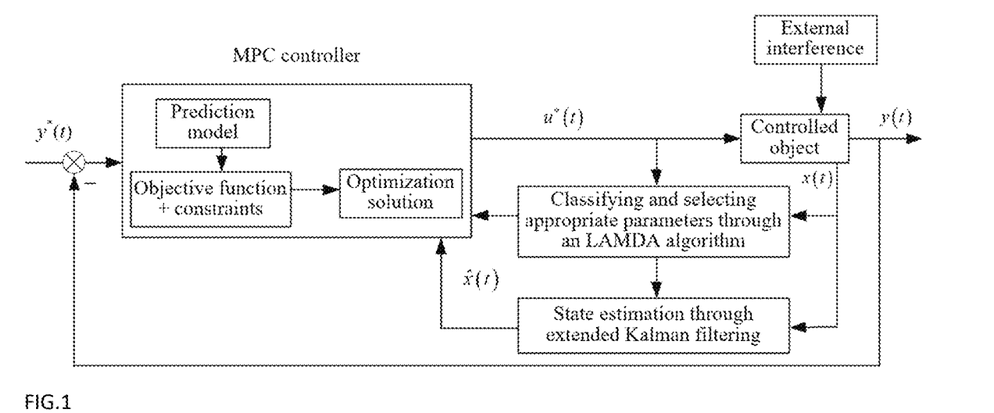
FIG. 1 is a design block diagram according to an Example of the present disclosure.

Referring to FIG. 1, the present example discloses a method for controlling an HVAC in a building based on adaptive MPC system, which optimizes system performance by monitoring in real time and adjusting control strategies to cope with environmental changes and changes in system dynamic characteristics. By combining with the LAMDA method and MPC, adaptive adjustment can be achieved, where y(t) specifically refers to control actions of the HVAC, such as compressor start/stop and damper adjustment. A prediction model specifically involves establishing a state matrix about a future period, known as the prediction model, which predicts a future state based on a current state and a control input.

Figure 2:
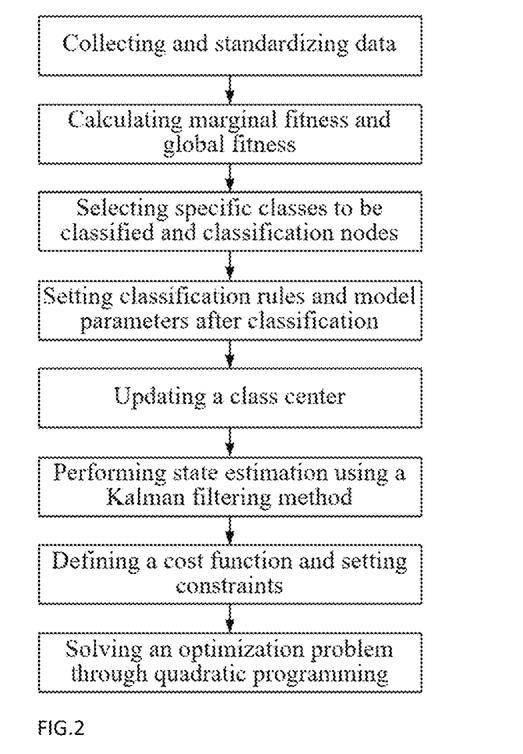
FIG. 2 is a flowchart of a method according to an Example of the present disclosure.

Specific steps are as follows:
Step 1: Data Updating:

In a running process of the HVAC in the building, model parameters are continuously updated through real-time data accumulation and an online learning algorithm, and parameters of a marginal fitness measure (MAD) and a global fitness measure (GAD) of LAMDA are adjusted according to new data to enable the model to adapt to environmental and state changes. Referring to FIG. 2, specific steps are as follows:

Step 1-1): Data Preprocessing and Classification:

Running conditions of the HVAC are classified by adopting the LAMDA method, and different model parameters may be selected according to the system state, so that adaptive control strategies are adopted for different operation states. The selection of classification nodes should be based on system characteristics and control objectives, and model parameters of each class are usually fixed after classification, so as to achieve optimal control effects in specific states.

Step 1-1-1): Data Collection:

Real-time data collected by sensors mounted at key positions of the HVAC. For example, indoor temperature sensors are mounted in centers of rooms, and outdoor temperature sensors are mounted at positions of devices that are away from a building and possibly generate heat; and indoor humidity sensors are mounted in centers of rooms, and outdoor humidity sensors may be mounted together with the outdoor temperature sensors.

In the present example, a data collection system is established to collect running data, so as to monitor and record the above parameters in real time.

The above data collection system comprises sensors for data collection, and signal conditioning and processing units, memories, and communication interfaces for processing the data collected by the sensors. Those skilled in the art may establish this part according to actual needs, which belongs to the existing technical means.

By changing the running conditions of the HVAC, such as load, ambient temperature and humidity, different working conditions are simulated, so that operation data (temperature data and humidity data) of the HVAC under different working conditions can be collected. The collected data (data points are individual, specific measurement values, which are raw data directly acquired from sensors or data sources; for example, a data point may be a temperature reading or humidity reading at a certain moment) are securely stored (stored in a standardized manner) in a database or other storage mediums for subsequent analysis. Each data point may be represented as a vector:

$$x^t = [x_1^t, x_2^t, \ldots, x_n^t];$$

wherein, $$x_i^t$$

represents a reading of an $i^{th}$ sensor at a $t^{th}$ time point, $t \in [1, T]$, and T represents an upper limit of a time interval.

Step 1-1-2): data standardization: real-time data simulating different working conditions are acquired from various sensors in the HVAC, and preprocessing, comprising denoising, outlier processing, and data cleaning, is performed on the collected data.

Through data cleaning, noise and outliers are removed.

Each data point is standardized, and the data are scaled a unified range to facilitate processing and comparison. The features of objects are normalized to [0, 1], and the performance is improved using the following formula:

$$\bar{x}_i = \frac{x_i - x_{min}}{x_{max} - x_{min}};$$

where $x_{min}$ is the minimum value of feature $x_i$, $x_{max}$ is the maximum value of feature $x_i$, and $\bar{x}_i$ is a normalized value of a feature vector of an $i^{th}$ sample point in class j.

Step 1-1-3): MAD: the fitness of each descriptor in each class is calculated. Descriptor is a structure used for describing the attribute and feature of data. It can provide information about the type, size, storage location and the like of data, and can achieve effective classification and state recognition of data, thereby providing a foundation for dynamic adjustment and optimization of the system.

The MAD of each data point for each class is calculated using a normal distribution equal probability density function, and the formula is as follows:

$$MAD(\bar{x}_i | \mu_{ij}, \sigma_{ij}) = e^{-\frac{1}{2}\left(\frac{\bar{x}_i - \mu_{ij}}{\sigma_{ij}}\right)^2};$$

wherein, $\mu_{ij}$ and $\sigma_{ij}$ respectively represent a mean and a standard deviation of class j corresponding to an $i^{th}$ descriptor.

Step 1-1-4): GAD: MADs of all descriptors are combined to calculate a fitness measure of each data point for each class.

In an adaptive control system, the calculation and updating of the GAD may be performed in real time, thereby helping the system to dynamically adjust the control strategies and optimize the system performance.

A fitness measure of each data point for each class is calculated by combining the marginal fitness measures (MADs) of all descriptors. The MADs are required when calculating the GAD. An MAD value of its descriptor with respect to a center point of each class is calculated to obtain a fitness vector. This fitness vector indicates the likelihood or fitness of the data point belonging to each class:

$$GAD(x|C_j) = \alpha \prod_{i=1}^{n} MAD(\bar{x}_i|\mu_{ij}, \sigma_{ij}) + (1-\alpha) \sum_{i=1}^{n} MAD(\bar{x}_i|\mu_{ij}, \sigma_{ij});$$

wherein, x is a standardized data point, $\bar{x}_i$ is a normalized value of a feature vector of an $i^{th}$ sample point in class j, $\alpha$ is a parameter for adjusting fuzzy partitioning, usually between 0 and 1, $MAD(\bar{x}_i|\mu_{ij},\sigma_{ij})$ is a MAD of an $i^{th}$ descriptor with respect to class $C_j$, and n is the number of descriptors, where $\mu_{ij}$ and $\sigma_{ij}$ are respectively a mean and a standard deviation of class j corresponding to the $i^{th}$ descriptor.

Step 1-1-5): classification selection: when classification is performed by applying the LAMDA method, the specific number of classes classified and the selection of classification nodes depend on the characteristics of the system and control objectives. Model parameters of each class are usually fixed after classification, so as to adopt adaptive control strategies for different operation states.

For example, samples (preprocessed data) may be classified into three classes, i.e., $j \in [1,3]$: class 1 ($C_1$): low fitness; class 2 ($C_2$): medium fitness; class 3 ($C_3$): high fitness.

Step 1-1-6): classification nodes: corresponding GAD thresholds are preset, and the criteria for selecting the GAD thresholds may be achieved through various methods such as empirical method, statistical method, cluster analysis, and cross validation. This design classifies the system states through the empirical method. Threshold #1=0.3; and Threshold #2=0.6.

Step 1-1-7): Classification Rules:
low fitness: if $GAD_i \leq$ Threshold #1, sample i belongs to $C_1$;
medium fitness: if Threshold #1<$GAD_i \leq$ Threshold #2, sample i belongs to $C_2$;
high fitness: if $GAD_i >$ Threshold #2, sample i belongs to $C_3$.

The system is classified into j classes, denoted as $C_j$.

Step 1-1-8): Model Parameters after Classification:
model parameters of each class are usually fixed after classification, so as to adopt adaptive control strategies for different operation states. Specific parameters comprise a state transition matrix $A_j$, a control input matrix $B_j$, a control output matrix $H_j$, a process noise covariance matrix $Q_j$, and a measurement noise covariance matrix $R_j$.

Low fitness $C_1$: $A_1=A_{low}$, $B_1=B_{low}$, $H_1=H_{low}$, $Q_1=Q_{low}$, and $R_1=R_{low}$;
Medium fitness $C_2$: $A_2=A_{medium}$, $B_2=B_{medium}$, $H_2=H_{medium}$, $Q_2=Q_{medium}$, and $R_2=R_{medium}$;
High fitness $C_3$: $A_3=A_{high}$, $B_3=B_{high}$, $H_3=H_{high}$, $Q_3=Q_{high}$, and $R_3=R_{high}$.

Step 1-1-9): determination of class to which data points belong: through real-time measured data, the system can classify a current operation state according to classification rules. By calculating the GAD of each class, data points are assigned to the class with the highest GAD value:

$$\text{Class}(x) = \arg\max_j GAD(x|C_j).$$

Step 1-1-10): updating of class center: a center of each class, i.e., a mean in a membership function, is updated according to a weighted average of memberships of data points:

$$\mu_{ij} = \frac{\sum_{i=1}^{n_j} MAD_{ij}(\bar{x}_i)\bar{x}_i}{\sum_{i=1}^{n_j} MAD_{ij}(\bar{x}_i)};$$

wherein, $\bar{x}_i$ is a normalized value of a feature vector of an $i^{th}$ sample point in class j, and $n_j$ is the number of sample points in class j.

The class to which the data points belong is determined through the above method, and the data points are assigned to the class with the highest GAD value. A classification result is used for state estimation and adjustment of control strategies.

Step 2: state estimation (Extended Kalman Filtering, EKF): according to the classification result, appropriate system parameters and a noise matrix are selected, the prediction and updating steps of Kalman filtering are performed using the adjusted parameters, and an accurate state estimate is provided.

Step 2-1): state space model: a state space model for the HVAC is constructed; it is assumed that the nonlinear state space model of the system is as follows:

$$x(k+1|C_j)=f_j(x(k),u(k))+w(k)$$

$$y(k|C_j)=h_j(x(k))+v(k);$$

wherein, x(k) is a state vector, considering indoor temperature T and humidity H; u(k) is a control input vector, considering cooling power $P_c$ and fan speed $F_s$; w(k) is process noise, and v(k) is measurement noise; y(k) is an output vector, considering indoor temperature T and humidity H, $f_j(x(k),u(k))$ is a nonlinear state transition function, and $h_j(x(k))$ is a nonlinear output function.

Step 2-2): first-order Taylor expansion linearization is performed on a state transition equation and an output equation in the nonlinear state space model, and the linearized equations are used for Kalman filtering.

Step 2-2-1): Linearization of State Transition Equation:
first-order Taylor expansion is performed on the nonlinear state transition equation $f_j(x(k),u(k))$ at a current state estimate $\hat{x}(k|k)$ and a control input u(k):

$$f_j(x(k), u(k)) \approx f(\hat{x}(k|k), u(k)) + \frac{\partial f}{\partial x}\bigg|_{x=\hat{x}(k|k), u=u(k)} (x(k) - \hat{x}(k|k));$$

wherein, $$\frac{\partial f}{\partial x}$$

is a Jacobian matrix or the state transition function $f$ with respect to the state x. The Jacobian matrix is calculated using the current state and the control input, and preset classification parameters are modified, thereby improving accuracy, denoted as $A_j(k)$:

$$A_j(k) = \left.\frac{\partial f_j(x, u)}{\partial x}\right|_{x=\hat{x}(k|k), u=u(k)}.$$

A partial derivative of the state transition function $f$ with respect to the control input u is sought to obtain the Jacobian matrix $B_j(k)$:

$$B_j(k) = \left.\frac{\partial f_j(x, u)}{\partial u}\right|_{x=\hat{x}(k|k), u=u(k)}.$$

A linearized state transition function is:

$x(k+1) \approx A_j(k)x(k) + B_j(k)u(k) + w(k)$.

Step 2-2-2): Linearization of Output Equation:

First-order Taylor expansion is performed on the nonlinear state transition equation h(k) at the current state estimate $\hat{x}(k|k-1)$:

$$h_j(x(k)) \approx h_j(\hat{x}(k|k-1)) + \left.\frac{\partial h_j}{\partial x}\right|_{x=\hat{x}(k|k-1)} (x(k) - \hat{x}(k|k-1));$$

wherein, $$\frac{\partial h}{\partial x}$$

is a Jacobian matrix or the output function h with respect to the state x, denoted as $H_j(k)$:

$$H_j(k) = \left.\frac{\partial h_j(x)}{\partial x}\right|_{x=\hat{x}(k|k-1)}.$$

A linearized output function is:

$y(k) \approx H_j(k)x(k) + v(k)$.

Step 2-3): extended Kalman filtering steps: prediction and update steps are performed to provide an accurate state estimate.

Real-time linearization and adjustment are performed on preset parameters A, B, H according to the current state and the control input during running, so as to improve the control accuracy.

According to the classification result, appropriate system parameters and a noise matrix are selected, and linearization is completed, so as to adjust the parameters of Kalman filtering and MPC to adapt to the current operation state. Prediction and updating steps of Kalman filtering are performed using adjusted parameters, an accurate state estimate is provided, and the model parameters are dynamically updated to enable the prediction model to accurately reflect the current dynamic behavior of the system. The prediction and updating steps of the extended Kalman filtering are as follows:

Step 2-3-1): Initialization, Comprising:

initial state estimate $\hat{x}(0)$; initial covariance matrix P(0); process noise covariance matrix $Q_j$; measurement noise covariance matrix $R_j$.

$\hat{x}(0) = x_0$, $P(0) = P_0$.

Step 2-3-2): Prediction Step, Comprising:

A state at a next time is predicted:

$\hat{x}(k|k-1) = f(\hat{x}(k-1|k-1), u(k))$.

A covariance matrix is predicted:

$$P_j(k|k-1) = A_j(k-1)P(k-1|k-1)A_j^T(k-1) + Q_j(k-1).$$

State transition matrix $A_j(k-1)$: the Jacobian matrix of the state transition function $f(x,u)$ with respect to the state x is used for linearizing nonlinear systems.

Process noise covariance matrix $Q_j$: the process noise covariance matrix describes the statistical properties of process noise w(k), which is typically assumed to be zero-mean Gaussian white noise.

Measurement noise covariance matrix $R_j$: the measurement noise covariance matrix describes the statistical properties of measurement noise v(k), which is typically assumed to be zero-mean Gaussian white noise.

Prior error covariance matrix $P_j(k|k-1)$: the prior error covariance matrix represents the covariance of a predicted state estimate error, which reflects the uncertainty of the state.

Step 2-3-3): Updating Step, Comprising:

A Kalman gain $K_j(k)$ is calculated:

$$K_j(k) = P_j(k|k-1)H_j^T(k)\left(H_j(k)P_j(k|k-1)H_j^T(k) + R_j(k)\right)^{-1}.$$

The state estimate $\hat{x}(k|k)$ is updated:

$\hat{x}(k|k) = \hat{x}(k|k-1) + K_j(k)(y(k) - h\hat{x}(k|k-1))$.

The covariance matrix P(k|k) is updated:

$P_j(k|k) = (I - K_j(k)H_j(k))P_j(k|k-1)$.

Kalman gain $K_j(k)$: the Kalman gain balances the predicted state and the measured value, and determines the weights of the predicted value and the measured value when updating the estimated state.

Output matrix $H_j(k)$: the Jacobian matrix of the output function h(x) with respect to the state x is used for linearizing an output model.

Posterior error covariance matrix $P_j(k|k)$: the posterior error covariance matrix represents the covariance of an updated state estimate error.

Step 2-3) is used for performing state estimation on the data previously collected by the sensors.

Step 2-4): dynamic adjustment of control input: At each control time, the above process is repeated and new state estimation and measurement data are used for next optimization to ensure continuous optimization of control strategies in a time-varying system. In a nonlinear time-varying system, extended Kalman filtering can provide accurate current state estimates, and MPC performs optimal control using these state estimates and future system changes. By selecting appropriate system parameters through classification and dynamically updating the state transition matrix and the control input matrix at each control time, MPC can effectively respond to the dynamic changes of the system and provide optimal control inputs. This method can significantly improve control effects and system performance in the HVAC.

Model adjustment: by dynamically updating the class center, the parameters of MAD and GAD of LAMDA can be adjusted according to new data. This dynamic adjustment ensures the accuracy of classification and enables the system to continuously optimize according to new data.

By using the above method, accurate state estimation is achieved, the model parameters are dynamically updated, and the state estimation result is used for calculating the cost function of MPC and optimizing the control strategies.

Step 3: Dynamic Optimization of Control Strategies:

the control rules and strategies of MPC are optimized according to new data and recognized states. In each control cycle, extended Kalman filtering is used for updating the model parameters, so that the system model can dynamically reflect the actual situation, thereby further improving the control accuracy. The control strategies are dynamically optimized based on the states and classes recognized by LAMDA, and according to the state estimates and model parameters updated by Kalman filtering.

In the above step, each class corresponds to different operation states after classification, so as to adopt adaptive control strategies for different operation states.

A state estimate updated by Kalman filtering is used as a current state input of an MPC, and an optimal control input sequence for a future period is solved through MPC based on a current state and a prediction model to adjust operation parameters of the heating and air conditioning system. Inputting this accurate state estimate into MPC can significantly improve the performance of MPC. Specific steps are as follows:

Step 3-1: definition of cost function: a cost function of MPC is defined using a state estimate as an initial state.

When inputting the Kalman-filtered state estimate into MPC, the cost function of MPC uses a state estimate $\hat{x}(k)$ provided by a Kalman filter as a current initial state. This means that the calculation of each predicted state $x(k+i)$ in the MPC optimization process is based on the current state estimate provided by the Kalman filter, thereby obtaining the cost function:

$$J = \sum_{i=0}^{N-1} \left[ (\hat{x}(k+i|k) - x_{ref}(k+i))^T \overline{Q}(\hat{x}(k+i|k) - x_{ref}(k+i)) + u(k+i)^T \overline{R}u(k+i) \right];$$

wherein, $\hat{x}(k+i|k)$ is predicted through the state estimate $\hat{x}(k)$ provided by the Kalman filter; $x_{ref}(k+i)$ is a target state; $u(k+i)$ is a control input vector (such as cooling power, fan speed, etc.); $\overline{Q}$ is a temperature error weight matrix; $\overline{R}$ is a control input weight matrix; N is the length of a prediction time domain.

Step 3-2: constraints for problem optimization: comprising a state constraint and a control input constraint.

Problem optimization needs to satisfy a physical constraint and an operation constraint of the system, comprising a state constraint and a control input constraint. Constraints may be represented as:

$x_{min} \leq x(k+i) \leq x_{max}$ $u_{min} \leq u(k+i) \leq u_{max}$ $y_{min} \leq y(k+i) \leq y_{max}$ wherein, $x_{min}$ and $x_{max}$ are upper and lower limits of the state vector, respectively; $u_{min}$ and $u_{max}$ are upper and lower limits of the control input vector, respectively; $y_{min}$ and $y_{max}$ are upper and lower limits of the output vector, respectively.

Step 3-3: solving of HVAC optimization problem through quadratic programming: the optimal control input sequence is solved by minimizing the cost function.

Room temperature can be enabled to be close to target temperature as much as possible to ensure comfort by minimizing the cost function; the energy consumption can be reduced and the energy efficiency of the system can be improved by controlling the cooling power and the fan speed. The optimal control input sequence $u(0), u(1), \ldots, u(N-1)$ is solved by minimizing the cost function and satisfying the constraints.

For example, optimal control strategy are implemented to adjust the cooling power and the fan speed; if the energy consumption of both cooling power P(k) and fan speed F(k) needs to be minimized simultaneously, the cost function may be expanded into a quadratic programming form:

$$\min \frac{1}{2} u^T \overline{H} u + \overline{f}^T u;$$

wherein, u is a control input vector, comprising P(k) and F(k), $\overline{H}$ is a coefficient matrix of a quadratic term, and $\overline{f}$ is a coefficient vector of a linear term.

Constraints:

Equality constraints: may be used for representing a dynamic equation of the system; which are as follows:

$A_{eq} u = b_{eq}$ $A_{eq} = A_j, b_{eq} = x$ (Energy balance);

wherein, $A_{eq}$ and $b_{eq}$ define the equality constraint.

Inequality constraints: may be used for representing a physical or operation limitation, comprising:

Control Input Limitation:

$$A_{ineq} u \leq b_{ineq}$$
$$A_{ineq} = \begin{bmatrix} I \\ -I \end{bmatrix}$$ (Temperature and power limitations);
$$b_{ineq} = \begin{bmatrix} u_{max} \\ -u_{min} \end{bmatrix}$$

State limitation: the specific form depends on upper and lower limits of a state variable:

$A_{ineq} x \leq b_{ineq}$;

wherein, $A_{ineq}$ and $b_{ineq}$ define the inequality constraint.

A matrix $\overline{H}$ (symmetric positive definite matrix) and a vector $\overline{f}$ are constructed according to an objective function:

$$\overline{H} = 2(B_j^T \overline{Q} B_j + \overline{R})$$
$$\overline{f} = 2 B_j^T \overline{Q}(A_j x(k) - x_{ref});$$

wherein, $A_j$ is a state transition matrix, $B_j$ is a control input matrix, $\overline{Q}$ is a state deviation weight matrix, $\overline{R}$ is a control input weight matrix, and $x_{ref}$ is a target state.

An optimal control input sequence is obtained through the above method, which is used for adjusting the operation parameters of the HVAC.

Step 3-4: control inputs are implemented and a first control input in the optimal control input sequence calculated through MPC is applied to the HVAC. An actual output and a predicted output of the system are monitored in real time, an error is calculated, and error information is fed back to a model updating and control strategy adjustment module to achieve closed-loop control.

Example 2

The objective of the present example is to provide a computer apparatus comprising a memory, a processor, and a computer program stored in the memory and runnable on the processor. The program, when executed by the processor, implements the steps of the above method.

Example 3

The objective of the present example is to provide a computer-readable storage medium.

The computer-readable storage medium has a computer program stored therein. The program, when executed by a processor, implements the steps of the above method.

Example 4

The objective of the present example is to provide an adaptive MPC system for controlling an HVAC in a building, comprising:
  an operation data acquisition module configured to acquire operation data of the HVAC under different working conditions, and perform preprocessing on the acquired data;
  a GAD calculation module configured to calculate a MAD of each data point for each class based on the preprocessed data, and calculate a fitness measure of each data point for each class by combining MADs of all descriptors to obtain a GAD;
  a classification module configured to set a GAD threshold, and classify current operation states of the system according to classification rules; and
  a control module configured to adopt adaptive control strategies for different operation states since model parameters of each class are fixed after classification, where in each control cycle, a state estimate updated by Kalman filtering is used as a current state input of an adaptive model based on the classification result, and an optimal control input sequence for a future period is solved based on a current state and a prediction model to adjust operation parameters of the HVAC.

Example 5

The objective of the present example is to provide a computer program product comprising instructions which, when run on a computer, cause the computer to implement the method and function described in any one of the embodiments above.

The steps involved in the above apparatus embodiments correspond to the steps in method embodiment 1. For the specific implementation, a reference may be made to the relevant description in embodiment 1. The term "computer-readable storage medium" should be understood as a single medium or multiple media that comprises one or more instruction sets; it should also be understood as comprising any medium capable of storing, encoding, or carrying an instruction set executed by a processor and causing the processor to implement any method in the present disclosure.

Those skilled in the art should understand that the various modules or steps in the present disclosure may be implemented using general-purpose computer apparatuses. Optionally, they may be implemented using program codes executable by computing apparatuses, so that they can be stored in storage apparatuses for execution by the computing apparatuses, or they can be respectively made into integrated circuit modules, or they can be implemented by making multiple modules or steps thereof into a single integrated circuit module. The present disclosure is not limited to any specific combination of hardware and software.

Although the specific embodiments of the present disclosure have been described with reference to the drawings, they do not limit the scope of protection of the present disclosure. Those skilled in the art should understand that various modifications or variations that can be made by those skilled in the art without contributing any inventive labor based on the technical solution of the present disclosure still fall within the scope of protection of the present disclosure.

The invention claimed is:

1. A method for adaptive control of a heating, ventilation, and air conditioning (HVAC) system in a building based on model predictive control (MPC), comprising:
  acquiring, by sensors, operation data of the HVAC system in the building under different working conditions, and performing preprocessing on the acquired operation data;
  calculating, by a processor, a marginal fitness measure (MAD) of each data point in the preprocessed operation data for each class based on the preprocessed operation data, and calculating, by the processor, a fitness measure of the each data point for the each class by combining marginal fitness measures (MADs) of all descriptors to obtain a global fitness measure (GAD);
  setting, by the processor, a GAD threshold, and classifying current operation states of the system according to classification rules;
  adopting, by the processor, adaptive control strategies for different operation states since model parameters of each class are fixed after classification; and using a classification result for state estimation and adjustment of the adaptive control strategies,
  wherein in each control cycle, a state estimate updated by Kalman filtering is used as a current state input of an adaptive model based on the classification result, and an optimal control input sequence for a future period is solved based on a current state and a prediction model to adjust operation parameters of the HVAC system;
  when inputting the Kalman-filtered state estimate into MPC, a state estimate $\hat{x}(k)$ provided by a Kalman filter is used as a current initial state to obtain a cost function of MPC;
  the cost function is:

$$J = \sum_{i=0}^{N-1} \left[ (\hat{x}(k+i|k) - x_{ref}(k+i))^T \overline{Q}(\hat{x}(k+i|k) - x_{ref}(k+i)) + u(k+i)^T \overline{R}u(k+i) \right];$$

wherein, $\hat{x}(k+i|k)$ is predicted through the state estimate $\hat{x}(k)$ provided by the Kalman filter; $x_{ref}(k+i)$ is a target state; $u(k+i)$ is a control input vector (such as cooling power, fan speed, etc.); $\overline{Q}$ is a temperature error weight matrix; $\overline{R}$ is a control input weight matrix; N is the length of a prediction time domain;

constraints for optimization comprise a state constraint and a control input constraint;

solving, by the processor, the optimal control input sequence by minimizing the cost function to satisfy the constraints;

applying a first control input in the optimal control input sequence calculated through the MPC to the HVAC system to control start/stop of a compressor, fan speed and opening of a damper; and monitoring an actual output and a predicted output of the HVAC system in the building in real time, performing a calculation of an error therebetween and feeding back the calculated error to the MPC to achieve an adaptive closed-loop control.

2. The method according to claim 1, wherein the model parameters of the each class comprise a state transition matrix, a control input matrix, a control output matrix, a process noise covariance matrix, and a measurement noise covariance matrix.

3. The method according to claim 1, further comprising: updating a center of the each class, defined as a mean in a membership function, by weighted averaging based on memberships of data points in the preprocessed operation data.

4. The method according to claim 1, wherein estimating a state of the HVAC system comprises:

constructing a state space model for the HVAC system;

linearizing a state transition equation in the state space model;

linearizing an output equation in the state space model;

performing real-time linearization and adjustment on preset parameters of the linearized state space model according to the current state and a control input during running; and performing prediction and updating steps of Kalman filtering using adjusted parameters, providing an accurate state estimate, and dynamically updating the model parameters to enable the prediction model to accurately reflect the current dynamic behavior of the system.

5. The method according to claim 4, wherein linearizing the state transition equation in the state space model specifically comprises:

performing first-order Taylor expansion on a nonlinear state transition equation in the state space model at a current state estimate and a control input;

calculating a Jacobian matrix using the current state and the control input, modifying preset classification parameters, and seeking a partial derivative of a state transition function with respect to the control input to obtain the Jacobian matrix; and finally obtaining a linearized state transition function;

wherein, linearizing an output equation in the state space model specifically comprises:

performing first-order Taylor expansion on a nonlinear output equation at the current state estimate to obtain a linearized output equation.

6. A computer program product comprising a computer program, the computer program, when executed by a processor, implementing the method according to claim 1.

7. A computer apparatus comprising a memory, a processor, and a computer program stored in the memory and runnable on the processor, the program, when executed by the processor, implementing the steps of the method according to claim 1.

8. A non-transitory computer-readable storage medium having a computer program stored therein, the program, when executed by a processor, implementing the steps of the method according to claim 1.

* * * * *